United States Patent [19]

Engemann

[11] 4,168,821
[45] Sep. 25, 1979

[54] CABLE GUIDE FOR MOVABLE CABLES

[75] Inventor: Manfred Engemann, Harsefeld, Fed. Rep. of Germany

[73] Assignee: Messerschmitt-Boelkow-Blohm GmbH, Munich, Fed. Rep. of Germany

[21] Appl. No.: 898,300

[22] Filed: Apr. 20, 1978

Related U.S. Application Data

[63] Continuation-in-part of Ser. No. 723,928, Sep. 16, 1976, abandoned.

[30] Foreign Application Priority Data

Sep. 20, 1975 [DE] Fed. Rep. of Germany ....... 2542079

[51] Int. Cl.² .............................................. B66D 1/36
[52] U.S. Cl. ............................. 254/190 R; 248/68 CB
[58] Field of Search ................... 254/190 R, 191, 141, 254/198, 190 D, 134.3 R; 248/68 R, 68 CB, 68 B; 242/157 R; 226/198, 89, 91, 196, 191

[56] References Cited

U.S. PATENT DOCUMENTS

| 2,387,520 | 10/1945 | Lindabury | 254/190 D |
| 3,080,135 | 3/1963 | Steijn | 242/157 R |
| 3,215,405 | 11/1965 | Walsh | 254/190 R |
| 3,650,447 | 3/1972 | Muka | 226/191 |

FOREIGN PATENT DOCUMENTS

| 538730 | 8/1941 | United Kingdom | 248/68 CB |
| 1134255 | 11/1968 | United Kingdom | 248/68 CB |

Primary Examiner—Robert J. Spar
Assistant Examiner—Kenneth Noland
Attorney, Agent, or Firm—Blanchard, Flynn, Thiel, Boutell & Tanis

[57] ABSTRACT

A cable guide arrangement utilizing a plurality of similar parts to facilitate convenient assemblage thereof while minimizing the number of differently constructed components. A pair of guide rails are secured together by spacer bolts and blocks having guide grooves therein are selectively located between the bolts. At least a pair of bolts is used for securing the cable guide arrangement to a supporting structure. Notches are provided in at least a pair of components to receive the enlargement intermediate the ends of the bolt. The enlargements effect a holding of the cable guide arrangement while one of the guide rails is removed to facilitate a cable insertion or repair or the like.

11 Claims, 7 Drawing Figures

_4,168,821_

CABLE GUIDE FOR MOVABLE CABLES

CROSS-REFERENCE TO RELATED APPLICATION

This is a continuation-in-part of application Ser. No. 723,928, filed Sept. 16, 1976 now abandoned.

FIELD OF THE INVENTION

The invention relates to a cable guide for movable cables, particularly in aircraft and spacecraft.

BACKGROUND OF THE INVENTION

Cable guides are already known in many variations. German OS No. 2,300,800 describes and illustrates an assemblable cable guide in which, depending on the need, prefabricated plastic elements can be inserted into the lower part of a rail guide. The plastic elements have so-called retaining springs, which fixedly press the respective cable on the floor. However, this no longer permits a movement of the cable in the sense of a power transmission. This known arrangement, aside from its expensive conception, cannot be used for the application of movable cables in aircraft and spacecraft.

German OS No. 2,401,733 discloses a guide element, which is composed of a formed upper part and a formed lower part, both made of plastic. These two parts have supplementary recesses in which the cable or cables can be stored side by side without contacting one another. The disadvantage of this construction is that the form parts, since they directly receive and carry the cables, must be constructed very strongly, because otherwise the vibrations become too great. In one case, the weight becomes too much for use in aircraft and spacecraft, in the other case the occurring vibrations are even less desired in the aircraft and spacecraft.

Therefore the purpose of the invention is to produce a cable guide for movable cables, which avoids the shown disadvantages. This purpose is attained by two guide rails, which are made of plastic or metal, being securable on the unit structure by means of spacer bolts and by plastic blocks with a cable guide groove being selectively inserted in place and number between the guide rails. Through the suggested use of functional individual members, a cable guide arrangement is produced which can be composed as desired and which permits a complete standardization of all guide elements and assures a quick installation and removal or exchange possibility. The spacer bolts contribute to this. They fix, when the cable guide is open, the guide elements on the side of the structure in their adjusted position. The entire guide element can be stored easily and requires relatively little space.

A further embodiment of the invention suggests that prefabricated spacers of different thicknesses are arranged between the plastic blocks.

These measures permit the inventive cable guide arrangement to be usable universally, because it becomes substantially independent of the cable thicknesses and the number of cables. Thus it is possible to guide cables having different thicknesses side by side at entirely equal intervals without requiring additional structural elements.

Furthermore it is desirable to provide a curved cable guide groove in individual plastic blocks and along the longitudinal axis thereof at desired radii. This measure primarily limits substantially the wear to both the cables and also to the guide blocks, because this embodiment permits to hold the cables also in the curves.

BRIEF DESCRIPTION OF THE DRAWINGS

Further advantages and measures can be taken from the following description and the claims. The invention is described and illustrated in connection with one exemplary embodiment, in which:

DETAILED DESCRIPTION

Figure 1:
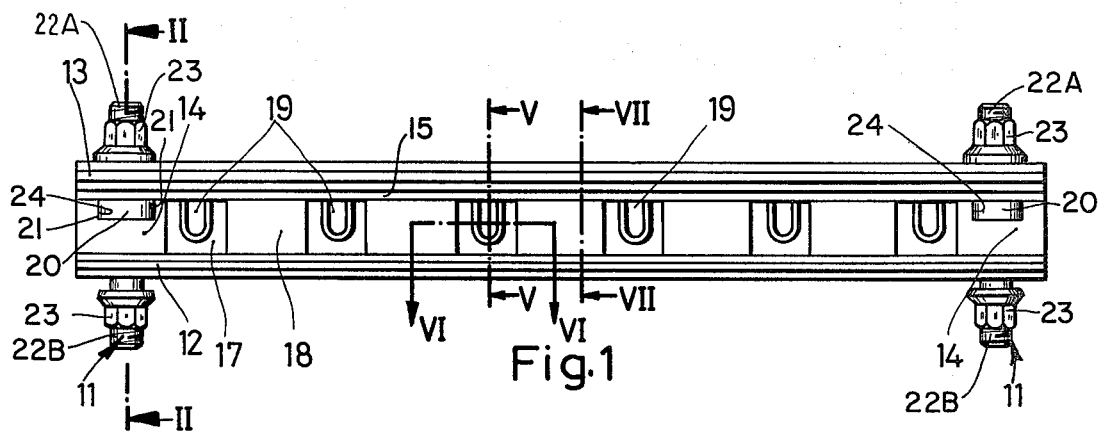
FIG. 1 is a side elevational view of the assembled arrangement.
Figure 2:
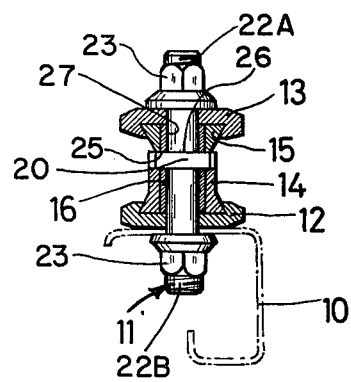
FIG. 2 is a cross-sectional view taken along the line II—II in FIG. 1.
Figure 3:
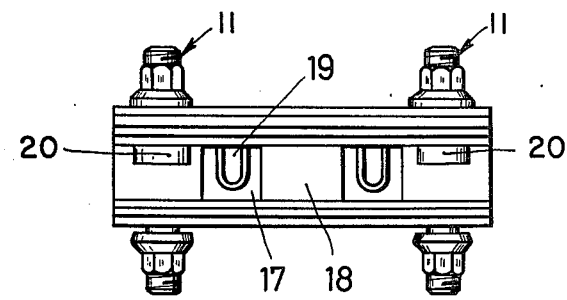
FIG. 3 is a side elevational view of a short construction.
Figure 4:
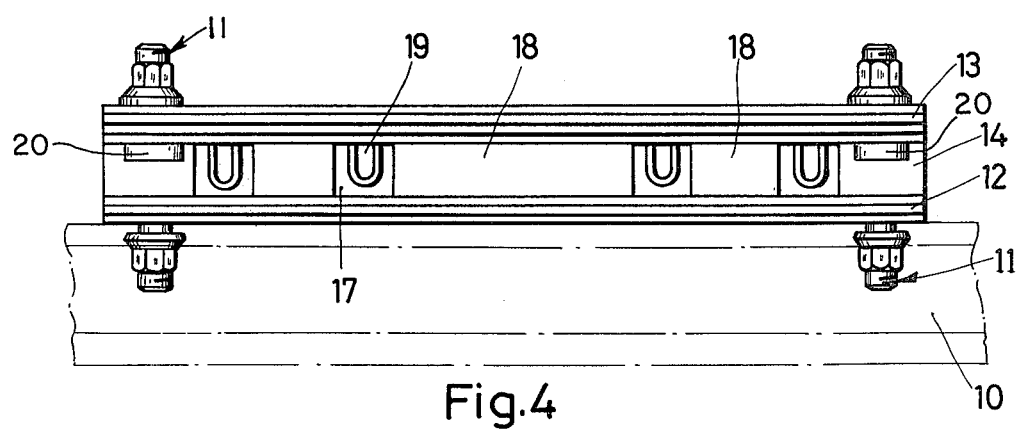
FIG. 4 is a side elevational view of a construction having different cable guide spacings.
Figure 5:
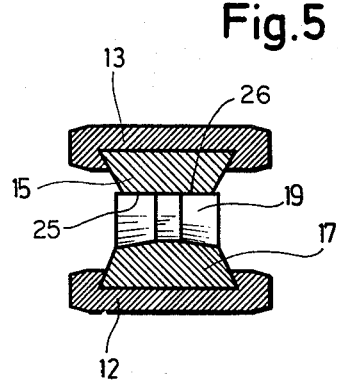
FIG. 5 is a sectional view taken along the line V—V of FIG. 1.
Figure 6:
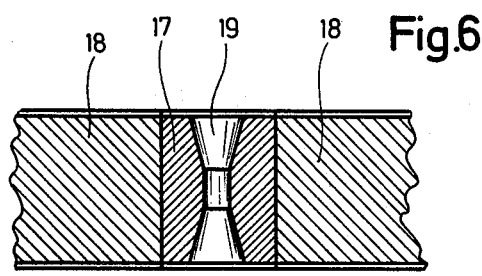
FIG. 6 is a sectional view taken along the line VI—VI of FIG. 1.
Figure 7:
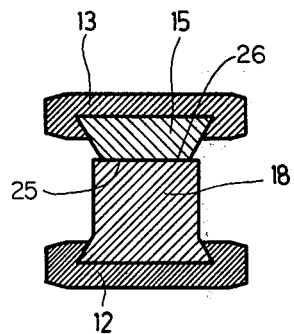
FIG. 7 is a sectional view taken along the line VII—VII of FIG. 1.

Spacer bolts 11 are supported at certain intervals in holes in a structural part 10—for example of the aircraft—, and extend through the guide rails 12, 13 which serve as the lower part and the upper part of the unit. The spacer bolts 11 have enlargements 20 intermediate the ends with a pair of opposite sides of the enlargements having flats thereon as at 21. The opposite ends of the bolts are threaded as at 22A and 22B and adapted to threadedly receive nuts 23 thereon. So-called spacer bolt receiving elements 14, 15 are positioned in the dovetail-like guides of the rails 12, 13 and have a pressed-in retaining sleeve 16 therein. The bolt receiving element 14 has a notched-out part 24 in the upper surface thereof wherein the horizontal spacing between the side walls of the notch is equal to the spacing between the flats 21 on the bolt 11. The enlargement 20 is received in the notched-out part 24 and maintained against rotation with respect to the bolt receiving element 14. In addition, the bolt receiving element 15 is separate from the bolt receiving element 14. The lower threaded ends of the bolts 11 are received in holes in the guide rail 12 and the nuts 23 effect a clamping of the bolt receiving element 14 between the enlargement 20 and the guide rail 12. Plastic blocks 17 which have cable guide grooves 19 are supported in the guide rail 12. The blocks 17 can be prefabricated with different groove radii for a number of common cable diameters. A spacing block 18 also of a preferable thermoplastic plastic is supported between each one of these blocks 17 and is engaged by the dovetail connection with the guide rail 12. The spacing blocks 18 can also have different thicknesses to thus increase or reduce the spacing between the cables. The spacing will in the first place depend on the cable diameter and furthermore on the place or the route to the operated device, for example to the rudder or elevator, or to the wing flaps, etc. In the case of short constructions, as one is shown in FIG. 3, one may possibly completely do away with spacing blocks if the cable diameter is relatively small. For a curved cable guide, it is provided that the longitudinal axis of individual prefabricated plastic blocks 17 is curved at a desired radii.

The bolt receiving element 15 is coextensive with the guide rail 13 and is engaged therewith through the dovetail connection. The lower surface 25 of the bolt receiving element 15 engages the upper surface 26 of each of the bolt receiving elements 14 and blocks 17 and 18. A pair of holes 27 extend through both the guide rail 13 and the bolt receiving element 15 and receive the upper threaded end 22A of the bolts 11 therethrough. The nuts 23 engaged with the ends 22A of the bolts 11 secure the guide rail 13 and bolt receiving element 15 to the guide rail 12 and associated support structure 10.

The guide rails 12, 13 may be made of both metal and also of thermoplastic plastic, whereby fibrous fill materials can be used to increase the hardness and sturdiness thereof. The plastic blocks 17, 18 can be constructed of thermoplastic plastics, like glassfiber-reinforced polytetrafluoroethylene, graphite-enriched polyamide, etc. The compression molding process or the die-casting process is suitable for this. Due to the fact that only a few structural elements which are equal in form are assemblable to a completely simple and highly efficient cable guide system, both the storage and also the installation or exchangability are very substantially simplified. However, the light weight construction of the structural elements and the glassfiber reinforcement which produces a very substantially increased wear resistance permits a utilization in aircraft and spacecraft. Here every degree of weight saving is of importance in the entire conception. The present invention here too has produced a considerable improvement.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A guide for a cable, comprising:
   a first elongated guide rail having a first profiled face thereon;
   a second guide rail extending parallel to said first guide rail and having a generally first surface coextensive with said second guide rail and facing said first guide rail;
   at least a pair of spaced spacer means for maintaining the spacing between said first and second guide rails, said spacer means having second profiled face thereon connected to said first profiled face, and said spacer means having a second surface facing said first surface;
   releasable fastening means for effecting a releasable connection of said first and second guide rails and a clamping of said spacer means between said first and second guide rails, said releasable fastening means including at least a pair of bolts having an enlargement intermediate the ends thereof and threaded opposite ends, each of said spacer means and said first and second guide rails having means defining holes therethrough for receiving one of said bolts therein, said spacer means having means defining a recess therein in said second surface for receiving said enlargement therein to prevent relative movement between said spacer means and said bolt, a first threaded fastener engaged with one of said threaded ends on each of said bolts to effect a clamping of said spacer means between said enlargement and said first guide rail and an associated supporting surface, a second threaded fastener engaged with the other of said threaded ends on each of said bolts to clamp said second guide rail between said second threaded fastener and said spacer means; and
   at least one U-shaped cable guide means mounted between said pair of guide rails and between said spacer means, said U-shaped cable guide means having a pair of parallel legs free of inwardly extending projections and said pair of parallel legs having third surfaces on the ends thereof facing said first surface and coplanar with a plane containing said second surface and said cable guide means having an interconnecting bight portion, said bight portion having third profile faces thereon snugly connected to said first profile face to prevent a relative separation of said cable guide means from said first guide rail in a direction perpendicular to the longitudinal axes thereof, the spacing between said legs, said bight portion and said first surface on said second guide rail defining a normally closed cable receiving opening facilitating a movement of said cable with respect thereto;
   whereby a release of said releasable fastening means will facilitate a release of the engagement of said first surface of said second guide rail from engagement with said third surfaces on said legs of said U-shaped cable guide means to open one side of said normally closed cable receiving opening to facilitate a removal and insertion of said cable from and into, respectively, said cable receiving opening.

2. A guide for a cable according to claim 1, wherein said first profile face is a dovetailed recess; and
   wherein said second and third profile faces are dovetailed tongues snugly received in said dovetailed recess in said first guide rail.

3. A guide for a cable according to claim 1, including a block means for filling the space between one of said pair of spacer means and said cable guide means when the width of said cable guide means is less than the spacing between said spacer means.

4. A guide for a cable according to claim 3, wherein said U-shaped cable guide means has a fixed width; and
   wherein said block means includes a plurality of blocks of varying widths to facilitate the placement of said cable guide means at any desired location between said spacer means with the remainder of the width between said spacer means being occupied by said plurality of said blocks, said blocks each having a fourth profiled face identical to said second and third profiled faces and received in said first profiled face, and said blocks also having a fourth surface coplanar with said third surface and engaging said first surface.

5. A guide for a cable according to claim 1, wherein said cable receiving opening has an arcuate bottom wall continuously coextensive with the facing wall surfaces on said legs, the oppositely facing edges of said cable receiving opening being each beveled to facilitate the receipt of said cable therein which may be nonaligned with the axis of said arcuate bottom wall.

6. A guide for a cable according to claim 1, wherein said cable guide means are made of plastic and wherein the plastic consists of a thermoplastic plastics—like polytetrafluoroethylene, or polyamide.

7. A guide for a cable according to claim 6, wherein glass fibers, graphite or molybdenumdisulfide fillets are embedded in the plastic.

8. A guide for a cable according to claim 1, wherein said guide rails are made of plastic and are reinforced by fiber materials, like glass, boron, carbon or metal.

9. A guide for a cable according to claim 1, wherein said guide rails are identical.

10. A guide for a cable according to claim 1, wherein said guide rails are made of metal.

11. A guide for a cable according to claim 1, wherein said second guide rail has an elongated member connected thereto by a fifth profiled face on said second guide rail and said elongated member, said first surface being provided on said elongated member.

* * * * *